(12) United States Patent
Baker et al.

(10) Patent No.: US 9,829,147 B2
(45) Date of Patent: Nov. 28, 2017

(54) HAND STABILIZER

(71) Applicants: Diane A. Baker, Berkeley, CA (US);
Malcolm D. Plant, Berkeley, CA (US)

(72) Inventors: Diane A. Baker, Berkeley, CA (US);
Malcolm D. Plant, Berkeley, CA (US)

( * ) Notice: Subject to any disclaimer, the term of this patent is extended or adjusted under 35 U.S.C. 154(b) by 0 days.

(21) Appl. No.: 14/515,941

(22) Filed: Oct. 16, 2014

(65) Prior Publication Data

US 2015/0108292 A1    Apr. 23, 2015

Related U.S. Application Data

(60) Provisional application No. 61/892,120, filed on Oct. 17, 2013.

(51) Int. Cl.
*F16M 11/04* (2006.01)
*A45D 29/00* (2006.01)

(52) U.S. Cl.
CPC ............. *F16M 11/04* (2013.01); *A45D 29/00* (2013.01)

(58) Field of Classification Search
CPC .. A47B 21/0371; A61F 5/0118; A61F 5/3723; B43L 15/00; F16M 11/04
See application file for complete search history.

(56) References Cited

U.S. PATENT DOCUMENTS

| | | | |
|---|---|---|---|
| 105,001 A * | 7/1870 | Sanborn | 248/118.5 |
| 561,562 A | 6/1896 | Brownson et al. | |
| 2,816,556 A * | 12/1957 | Weber et al. | 132/75 |
| 2,835,905 A * | 5/1958 | Tomasson | A47G 9/10 5/632 |
| 3,295,518 A * | 1/1967 | Hazlewood et al. | 128/877 |
| 3,946,451 A * | 3/1976 | Spann | A61G 7/0755 5/650 |
| 4,094,014 A * | 6/1978 | Schroeder | A41D 19/01505 2/161.8 |
| 4,713,846 A * | 12/1987 | Hodroski, Jr. | A47K 17/00 4/254 |
| 5,074,501 A | 12/1991 | Holtta | |
| 5,265,835 A * | 11/1993 | Nash | 248/118 |
| 5,730,711 A * | 3/1998 | Kendall et al. | 602/64 |
| 5,845,884 A * | 12/1998 | Terbrack | 248/118 |
| 5,868,365 A * | 2/1999 | Hesley | 248/118 |
| 6,490,742 B2 * | 12/2002 | Hall | A61G 7/075 128/845 |
| D479,719 S * | 9/2003 | Kerscher et al. | D14/460 |

(Continued)

FOREIGN PATENT DOCUMENTS

| | | |
|---|---|---|
| CA | 2318176 | 7/1999 |
| WO | WO2015058009 | 4/2015 |

OTHER PUBLICATIONS

Nails Magazine, "Pampered Perch Ergonomic Arm and Foot Rest", Mar. 26, 2013, URL <http://www.nailsmag.com/product/96346/ergonomic-arm-and-foot-rest>.

*Primary Examiner* — Jeanette E Chapman
(74) *Attorney, Agent, or Firm* — Brian Beverly; Beeson Skinner Beverly, LLP

(57) ABSTRACT

A hand stabilizer comprises a support body having a planar bottom surface, a sloped top face and an upwardly facing sloped cradle between two opposing shoulders, the cradle being sized for supporting the ulnar aspect of the palm of a hand, such that the hand is steadied in order to facilitate performance of tasks requiring higher degrees of manual dexterity.

15 Claims, 9 Drawing Sheets

(56) References Cited

U.S. PATENT DOCUMENTS

| | | | |
|---|---|---|---|
| 7,028,581 B2* | 4/2006 | Williams et al. | 74/551.9 |
| D539,066 S* | 3/2007 | Coquillette | D6/601 |
| D734,545 S* | 7/2015 | Cantu | D28/57 |
| D766,383 S* | 9/2016 | Fleming | D21/684 |
| 2002/0147084 A1* | 10/2002 | Liang | A63B 21/023 482/140 |
| 2003/0209641 A1* | 11/2003 | Cooke | 248/118 |
| 2011/0095142 A1* | 4/2011 | Quiroga et al. | 248/118 |
| 2013/0023392 A1 | 1/2013 | Glickfield | |
| 2014/0263878 A1* | 9/2014 | Moy et al. | 248/118 |

* cited by examiner

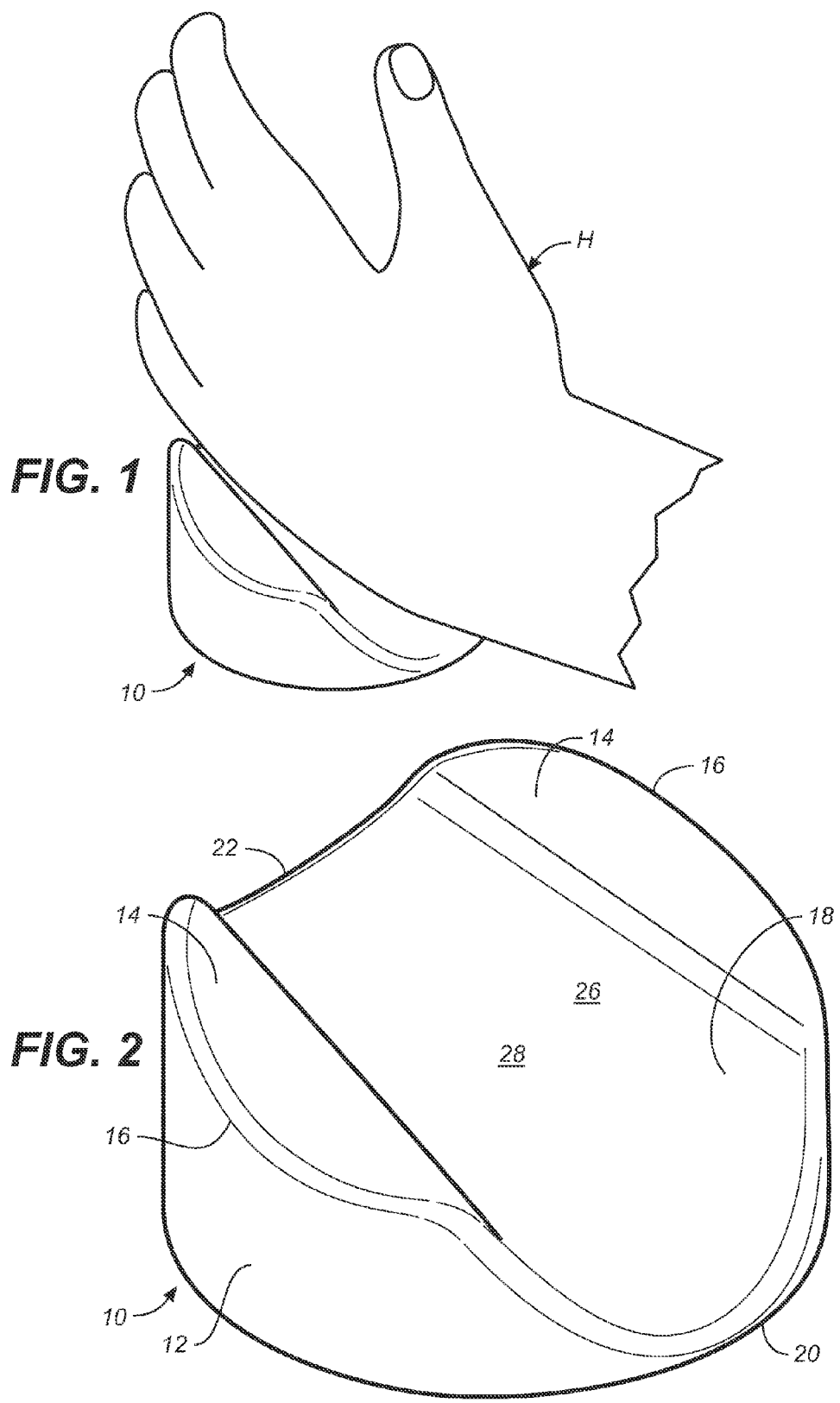

HAND STABILIZER

CROSS-REFERENCE TO RELATED APPLICATIONS

This application claims the benefit of U.S. Provisional Application No. 61/892,120 filed Oct. 17, 2013.

BACKGROUND

Field of the Invention

This invention relates to devices used in the care and maintenance of hands for hygienic, medical, cosmetic, artistic and other purposes, and in particular to a hand stabilizer for bracing one's hand while using it to perform tasks requiring higher levels of manual dexterity. For example, a hand stabilizer can be used to stabilize a person's non-dominant hand to facilitate applying nail polish to or otherwise decorating the fingernails of the person's dominant hand.

Description of the Related Art

Many tasks requiring manual dexterity are more difficult to perform when using one's non-dominant hand. Applying nail polish to one's fingernails, for example, is a delicate and precise operation requiring a high level of precision. Generally it is easier to decorate the fingernails on one's non-dominant hand using the dominant hand because it is easier to control the dominant hand than the non-dominant hand. Conversely, it is more difficult to decorate the fingernails on one's dominant hand because the non-dominant hand must be used. For example, applying polish to the small and difficult-to-access outermost edge of the fingernail on the little finger on one's dominant hand can be awkward and frustrating.

There is, therefore, a longstanding need for a device that will compensate for the diminished degree of control available when the non-dominant hand must be used to perform tasks requiring fine motor skills such as fingernail polishing and decorating.

BRIEF DESCRIPTION OF THE DRAWINGS

FIG. 1 is an upper perspective view showing a hand stabilizer according to the invention supporting and stabilizing a hand;

FIG. 2 is a close-up upper perspective view of the hand stabilizer shown in FIG. 1;

DETAILED DESCRIPTION OF THE ILLUSTRATED EMBODIMENT

A hand stabilizer according to the invention is referred to generally at numeral 10 in FIGS. 1 and 2. The illustrated embodiments of a hand stabilizer are depicted and described herein in relation to use of a person's non-dominant hand H to apply nail polish or otherwise decorate the fingernails of the person's dominant hand for exemplary purposes. Those of skill in the art will recognize, however, that the invention may be put to myriad other uses in medical, scientific, cosmetic, artistic and other fields to perform manual tasks that will benefit from stabilizing one's hand, particularly one's non-dominant hand.

Figure 4:
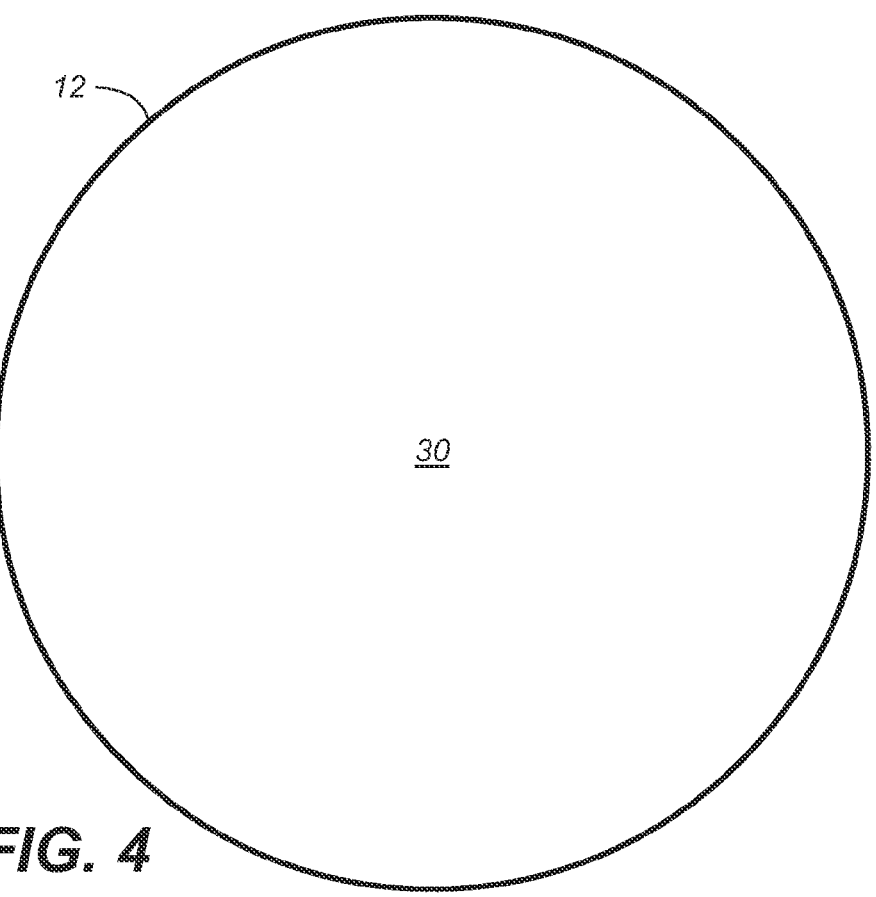
FIG. 4 is a bottom plan view thereof.
Figure 6:
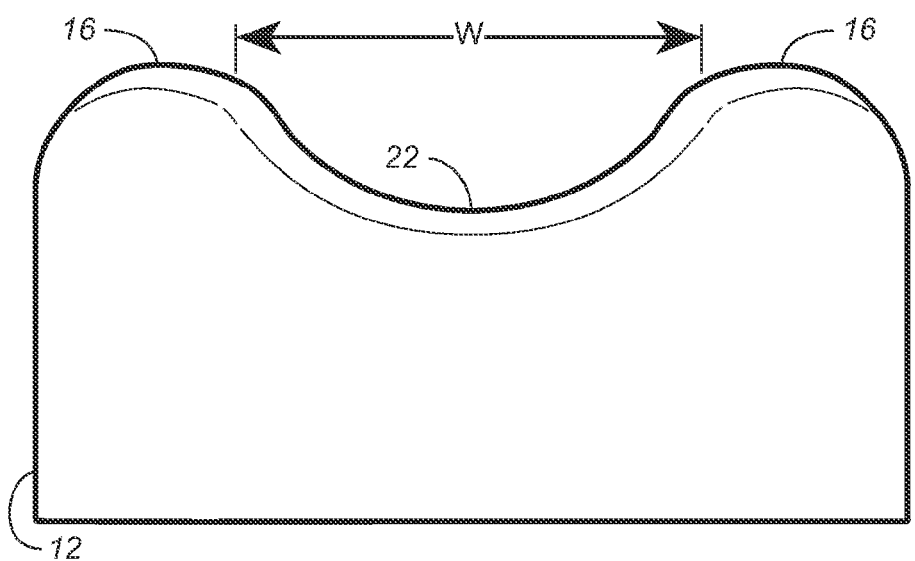
FIG. 6 is a rear elevation view thereof.

The hand stabilizer 10 comprises a support body 12 for resting on a horizontal work surface, a sloped top face 14, two shoulders 16, and an upwardly facing cradle 18 extending between the two shoulders 16. The support body 12 includes a flat bottom surface 30 as seen in FIG. 4, but it will be understood by those of skill in the art that the hand stabilizer may be hollow such that the support body 12 could consist of a circular perimeter portion only.

Figure 3:
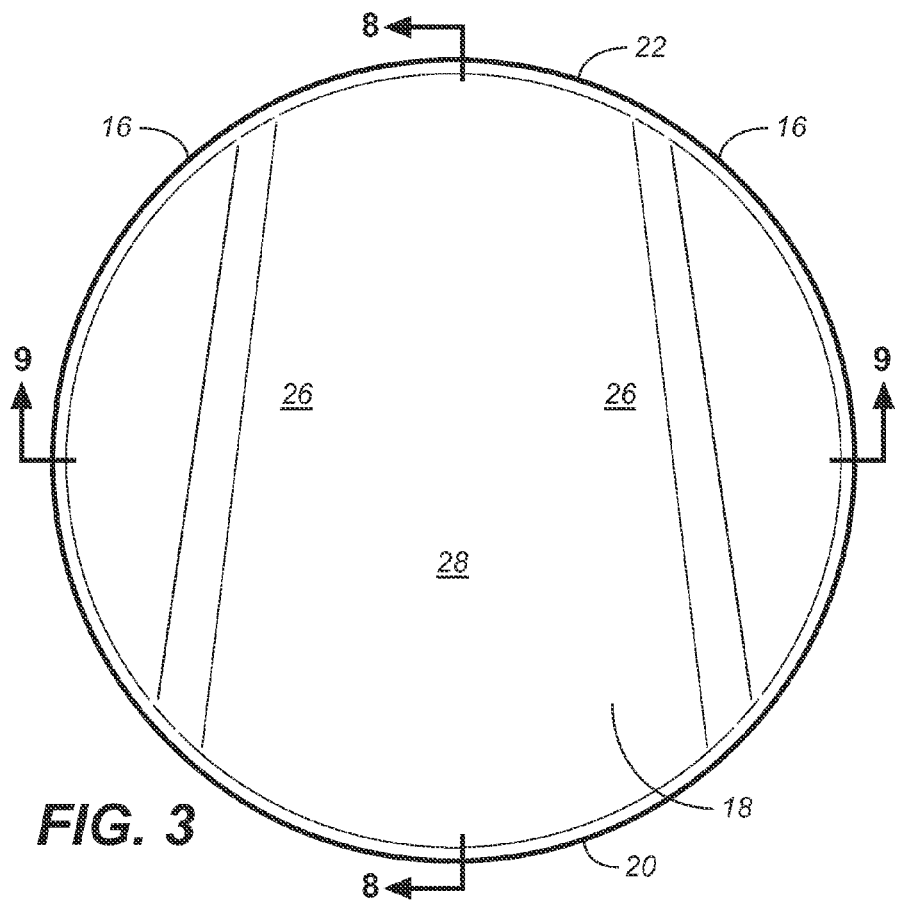
FIG. 3 is a top plan view thereof.
Figure 7:
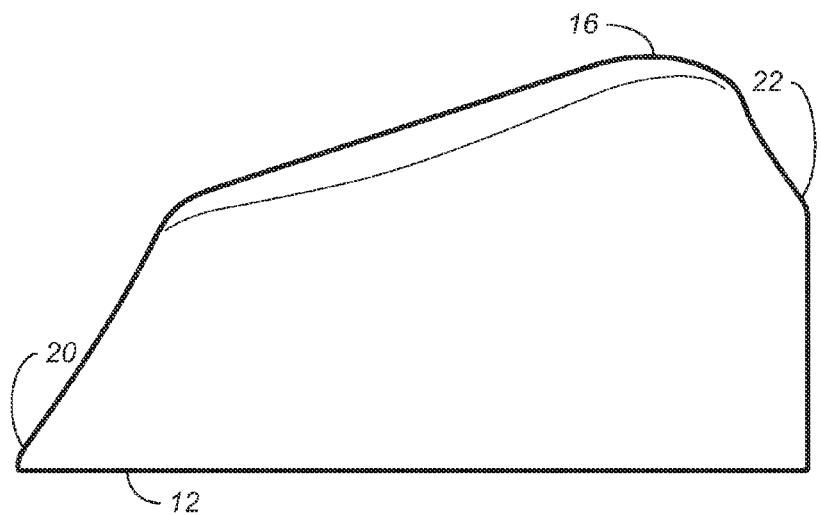
FIG. 7 is a right side elevation view thereof, of which the left side elevation view would be a mirror image.
Figure 8:
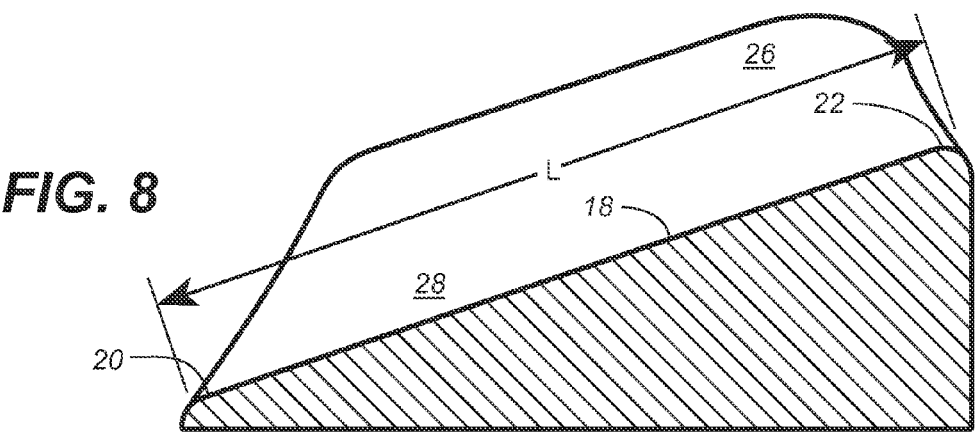
FIG. 8 is a sectional view thereof taken along lines 8-8 of FIG. 3.

With additional reference to FIGS. 3, 7 and 8, it is seen that the cradle 18 has a length L extending between a proximal edge 20 and a distal edge 22 at opposite lengthwise ends of support body 12. In one embodiment the length L of the cradle 18 is sized to approximate the length of the ulnar aspect of the palm of a human hand as shown in FIG. 1. Relative to the support body 12, the proximal edge 20 is lower than the distal edge 22 such that placement of the ulnar aspect of the palm of a hand in the cradle tilts the hand upwards, thus elevating the fingers higher than the wrist above the work surface.

Figure 5:
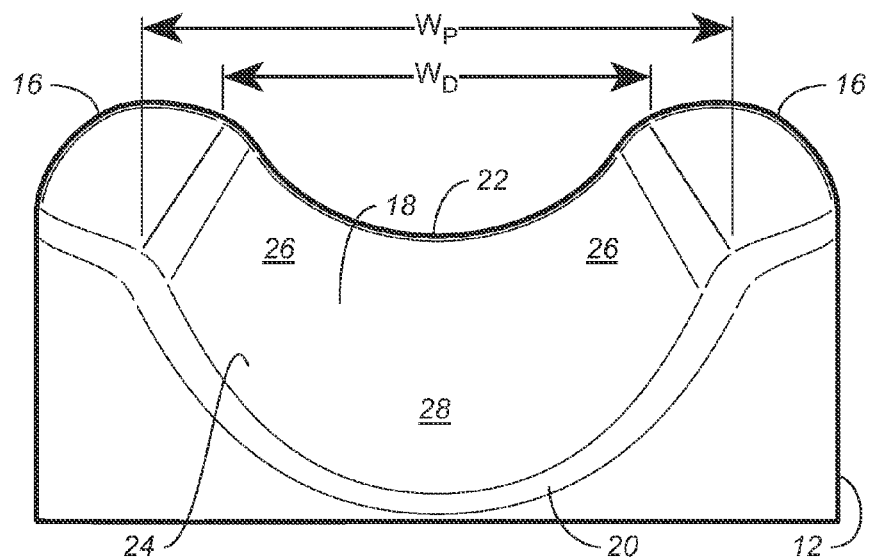
FIG. 5 is a front elevation view thereof.
Figure 9:
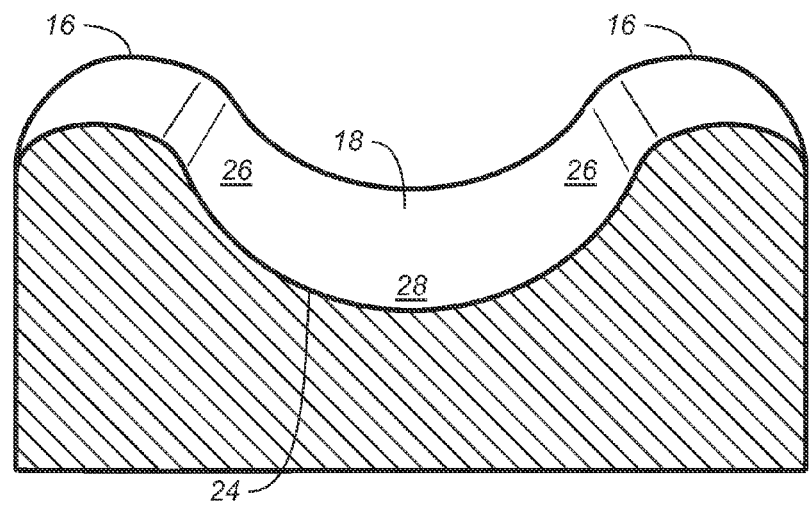
FIG. 9 is a sectional view thereof taken along lines 9-9 of FIG. 3.

As seen in FIGS. 5 and 9, the cradle 18 has a width W between opposing shoulders 16 such that the cradle is sized to comfortably receive the ulnar aspect of the palm of a hand. The cradle 18 forms a smoothly graduated concave surface 24 extending transversely between the two shoulders 16. The concave surface 24 includes two sloped side faces 26 and an arced central support surface 28 extending between the side faces 26. Those of skill in the art will understand that in other embodiments the surface 24 may be deeper or shallower, exhibit a different slope, and have variously shaped transverse profiles other than shown in the illustrated embodiment according to individual physical requirements and the nature of the tasks to be facilitated. For example, the support surface 24 could have a stepped surface, a flat bottom face, vertical sides and multiple different slopes along its length.

As seen in FIGS. 2, 3 and 5, in the illustrated embodiment the width $W_P$ of the cradle 18 is greater at the proximal edge 20 thereof than the width $W_D$ at the distal edge 22. Those of skill in the art will recognize that the width of the cradle may vary generally, at different points throughout its length, and at the proximal and distal edges to accommodate different physiques and to optionally support a person's wrist or forearm. However, forming the distal edge 22 more narrowly than the proximal edge 20 not only conforms to the generally narrowing shape of the ulnar aspect of the palm of a human hand, but the closerside faces 26 near the distal edge 22 provide reference or guide surfaces that guide and support the medial aspect of the palm of the hand thereby enabling more precise control of the fingers as can best be appreciated with reference to FIGS. 1, 5 and 10.

Figure 10:
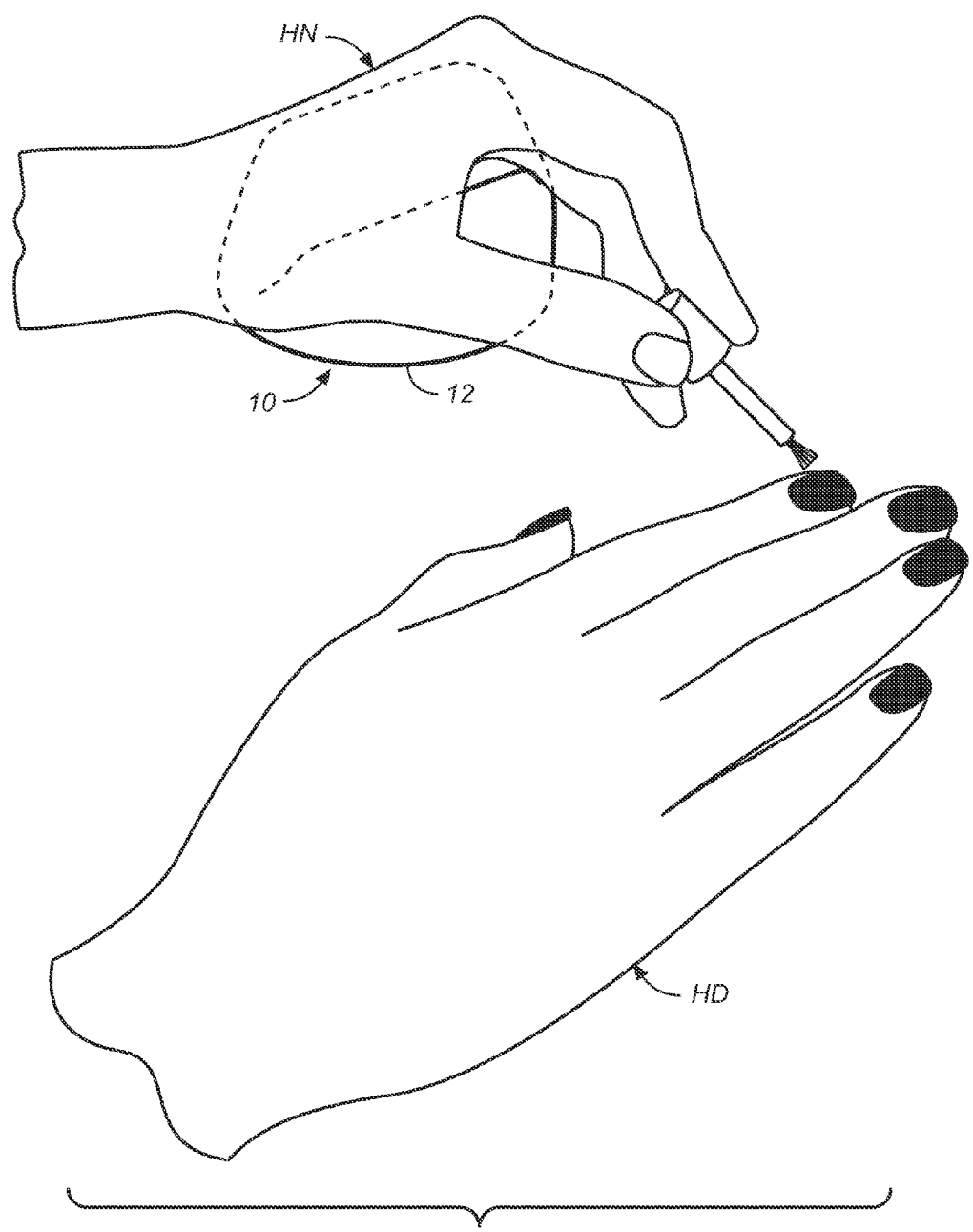
FIG. 10 is an upper perspective view showing one hand being used to polish the fingernails of the other hand while being steadied by a hand stabilizer according to the invention.
Figure 11:
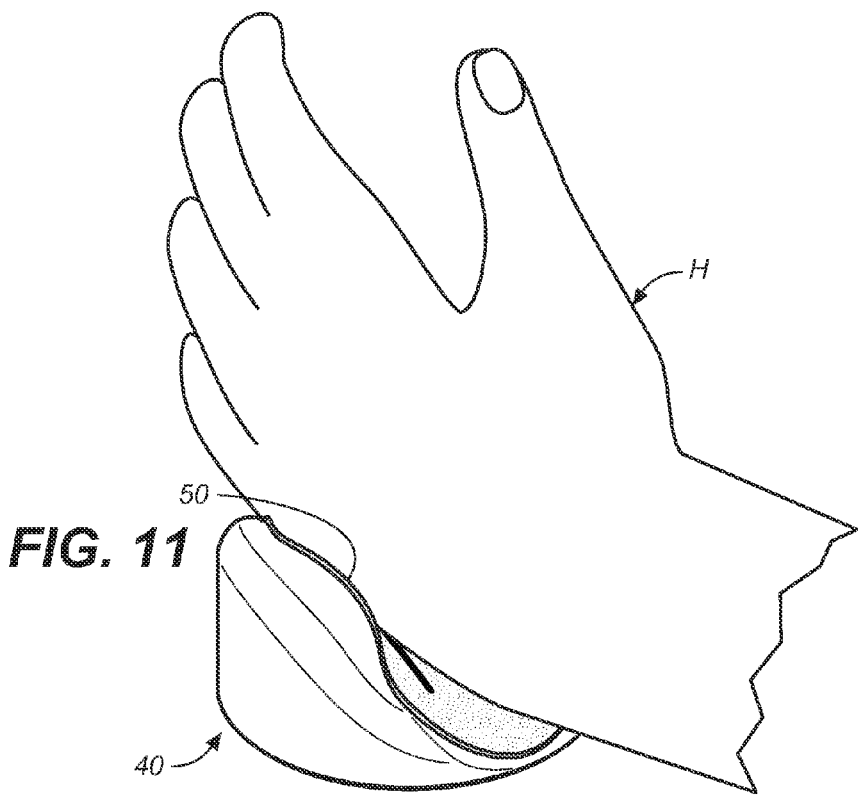
FIG. 11 is an upper perspective view of another embodiment of a hand stabilizer according to the invention shown supporting and stabilizing a hand.

As seen in FIG. 10, supporting the ulnar aspect of the palm of a hand in the cradle of the hand stabilizer 10 elevates the non-dominant hand HN above a work surface and positions the fingers of that hand in a raised disposition above a work surface such that an instrument being grasped by the non-dominant hand HN can be more easily and precisely positioned and manipulated at the site of a task to be performed, such as for decorating the fingernails on one's dominant hand HD.

FIGS. 11-19 show an alternative embodiment 40 of a hand stabilizer. Similar to the embodiment shown in FIGS. 1-9, the hand stabilizer 40 comprises a support body 42, a sloped top face 44, and an upwardly facing cradle 48 disposed between two opposing shoulders 46. As seen particularly in FIG. 18, the cradle 48 has a length L sized to approximate the length of the ulnar aspect of the palm of a human hand.

Figure 12:
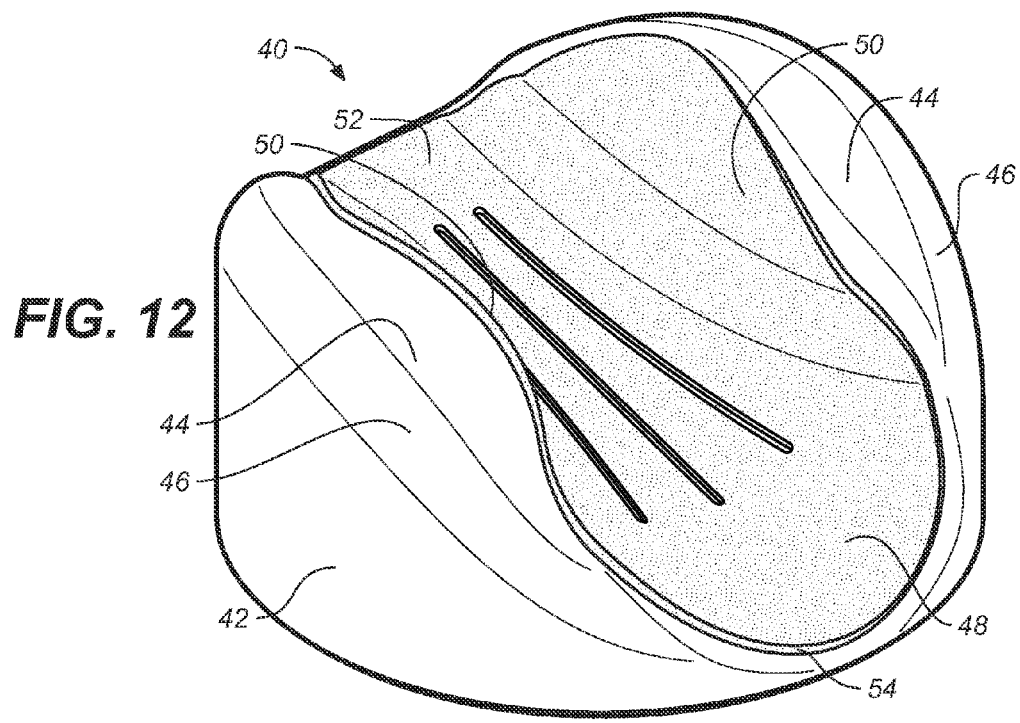
FIG. 12 is a close-up upper perspective view of the hand stabilizer shown in FIG. 11.
Figure 13:
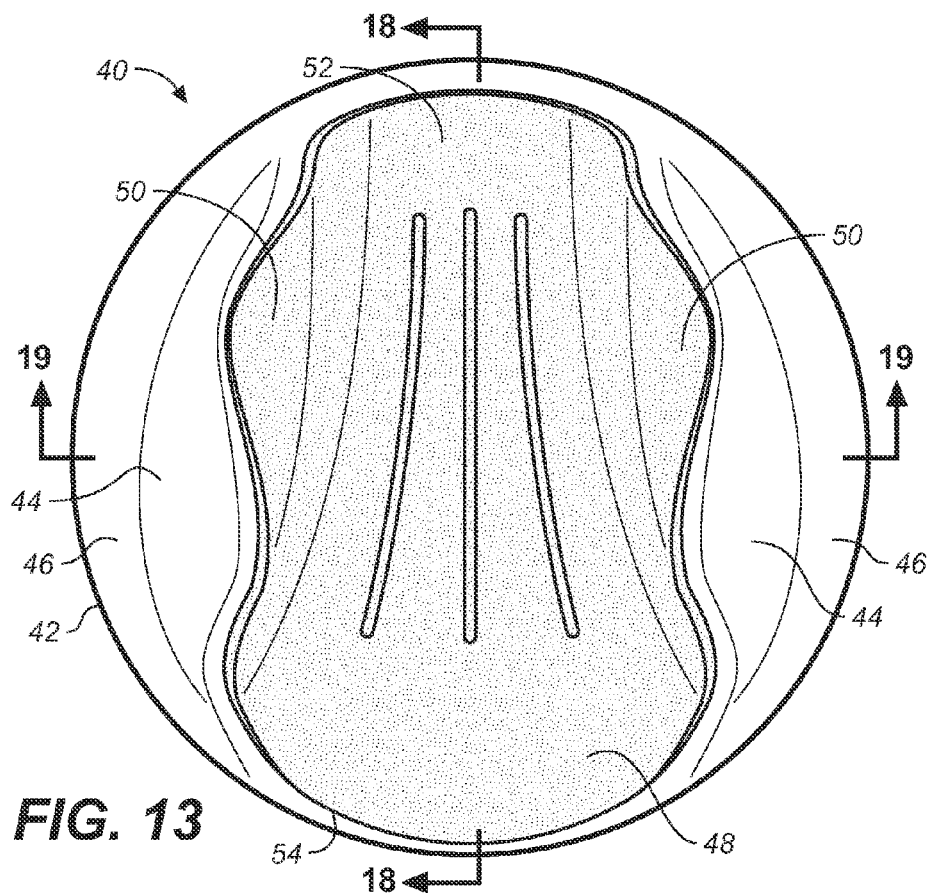
FIG. 13 is a top plan view thereof.
Figure 15:
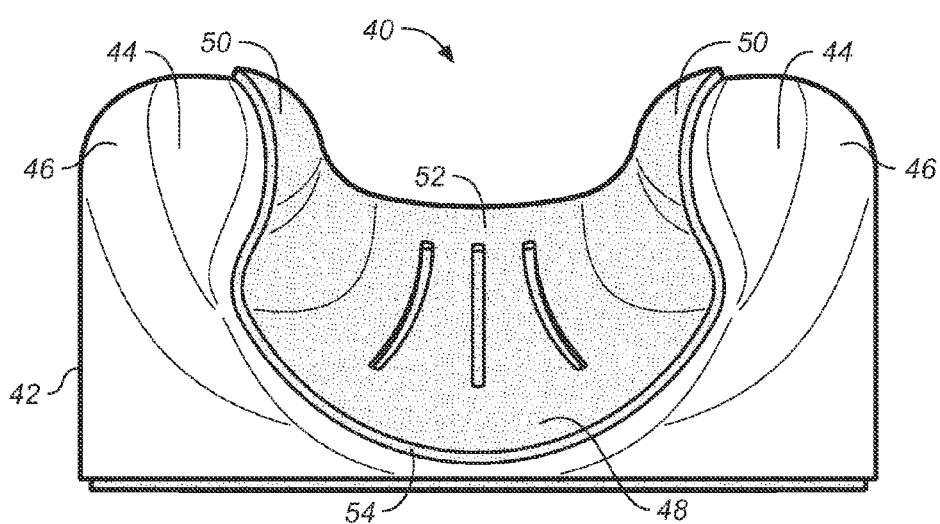
FIG. 15 is a front elevation view thereof.
Figure 16:
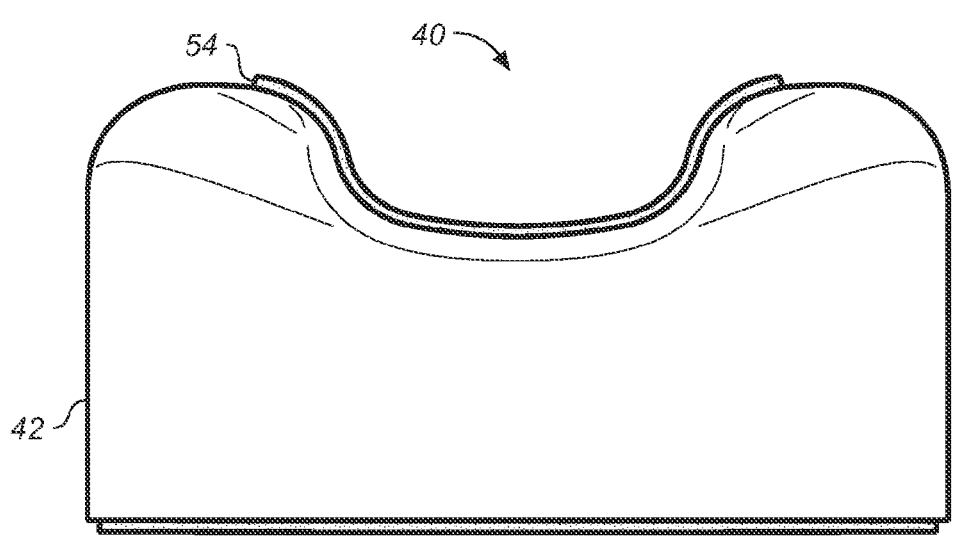
FIG. 16 is a rear elevation view thereof.
Figure 17:
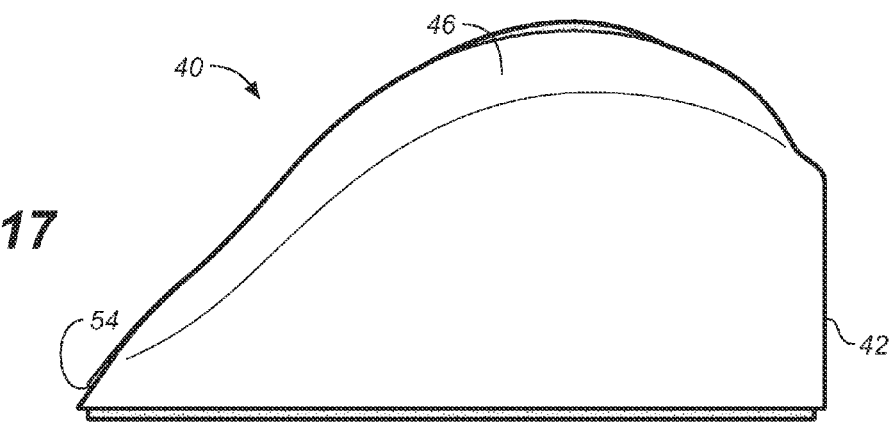
FIG. 17 is a right side elevation view thereof, of which the left side elevation view would be a mirror image.

The geometry of cradle 48 is similar to that of cradle 18 discussed above. As shown by FIGS. 15 and 16, the width of the cradle at the lower end is wider than the width at the upper end to conform to the typical shape of the ulnar aspect of a human hand. In this embodiment, however, as best seen in FIGS. 12-13 and 15, opposing palm-supporting bulbous protuberances 50 extend inwardly from the upper portion of the cradle 48 between the center support surface 52 of the cradle and top face 44. The shape of protuberances 50 is dimensioned to conform to the palm of a hand in order to provide improved lateral support and tactile reference surfaces which help stabilize the hand and facilitate performance of tasks requiring manual dexterity. In particular, protuberances 50 have a lengthwise convex profile extending substantially the entire distance between the distal and proximal edges of cradle 48 and a convex vertical profile extending substantially the entire distance between the top face 44 and center support surface 52.

In the illustrated embodiment, the cradle is provided with a slip-resistant surface 54. In another embodiment, the slip-resistant surface 54 may be formed using an overmolding insert formed of rubber or any flexible substance that has the grip and comfort qualities of rubber.

Figure 14:
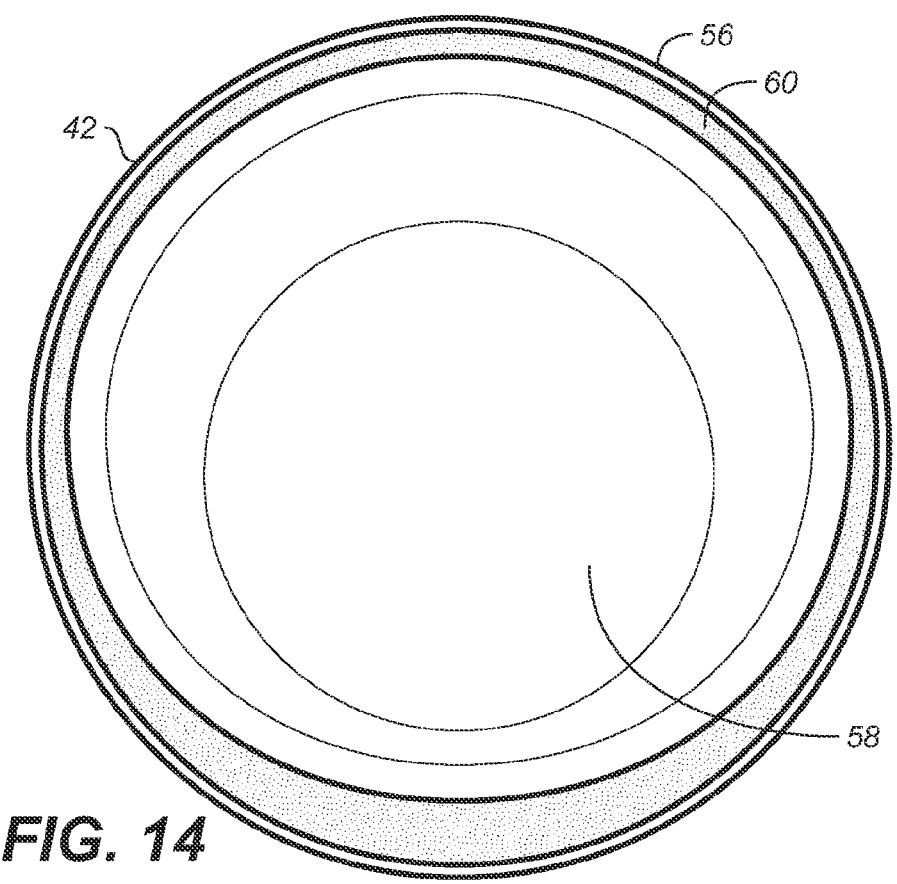
FIG. 14 is a bottom plan view thereof.
Figure 18:
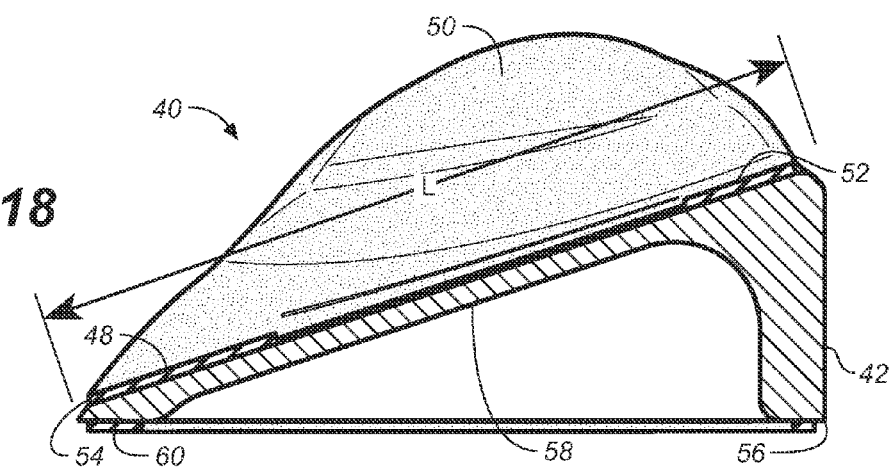
FIG. 18 is a sectional view thereof taken along lines 18-18 of FIG. 13.
Figure 19:
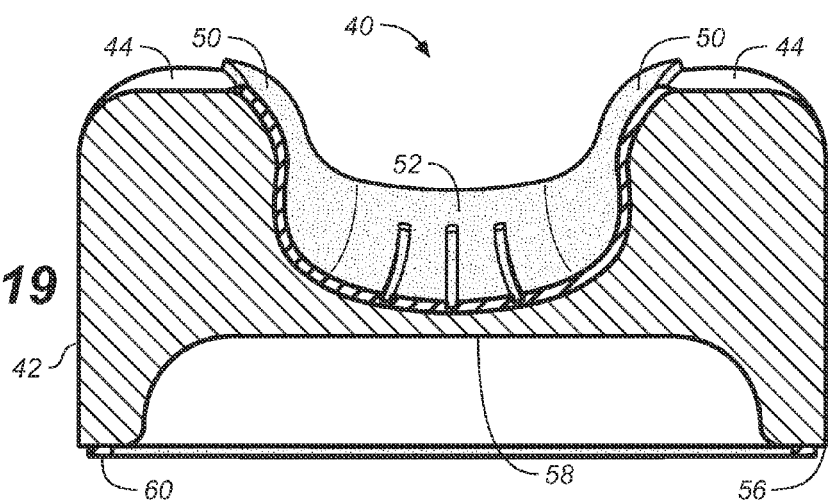
FIG. 19 is a section view thereof taken along lines 19-19 of FIG. 13.

The underside of support body 42 includes an annular support wall 56 defining a large center recess 58 as seen in FIGS. 14, 18 and 19. In one aspect of the invention, a non-slip annular ring 60 is mounted on the bottom of the support wall 56 to provide a stable seat for resting the device on a work surface.

A hand stabilizer according to the invention steadies the supported hand lengthwise and the sloped side surfaces of the cradle provide lateral support and reference surfaces that help guide precise hand movements and thus facilitate the performance of tasks requiring higher degrees of manual dexterity. Stabilizing the hand compensates for the reduced degree of control available when using the non-dominant hand and thereby facilitates use of the non-dominant hand to execute the fine motor skills needed to decorate fingernails or perform other work requiring precise hand movements. Finally, it will be appreciated that a hand stabilizer as described could be used in support of the dominant hand as desired.

There have thus been described and illustrated certain embodiments of a hand stabilizer according to the invention. Although the present invention has been described and illustrated in detail, it should be clearly understood that the disclosure is illustrative only and is not to be considered as limiting, the spirit and scope of the invention being limited only by the terms of the appended claims and their legal equivalents.

We claim:

1. A hand stabilizer comprising:
a support body having a bottom face, a sloped top face, a proximal end, a distal end opposite the proximal end, a length between said proximal and distal ends, and an upwardly facing cradle extending between said proximal and distal ends, said bottom face for resting on a work surface, said cradle for supporting the ulnar aspect of the palm of a hand,
said cradle having a proximal edge disposed at the proximal end of said support body and adjacent said bottom face, a distal edge disposed at the distal end of said support body and elevated above said proximal edge a distance of at least one-third of the length of the support body, a concave center support surface extending between said proximal and distal edges, and two opposing inwardly-facing side support walls extending upwardly from said center support surface to said top face, the cradle having a depth and a width, the depth of the cradle at said distal edge being at least thirty percent of the width at said distal edge, the width of the cradle at said distal edge being at least twenty percent narrower than the width of the cradle at said proximal edge, said proximal edge configured to support the wrist end of the ulnar aspect of a hand resting on the center support surface of said cradle adjacent the work surface, said distal edge configured to support the phalangeal end of the ulnar aspect of such hand in a disposition elevated above the work surface, and
the side support walls of said cradle at said distal edge are configured to engage the medial aspect of the palm of a hand, the wrist end of the ulnar aspect which is resting on the center support surface of said cradle at the proximal edge thereof, and the phalangeal end of the ulnar aspect of which is resting on the center support of said cradle at the distal edge thereof, so that the phalangeal end of the palm thereof is supported at an angle of at least 25° relative to the bottom face that positions the thumb and the first and second fingers above the other fingers of the hand and in a sufficiently elevated position above said work surface that they may grasp and manipulate an instrument for working on an adjacent object on the work surface with improved manual dexterity.

2. The hand stabilizer of claim 1 wherein:
the transverse profile of said cradle near said distal edge is sufficiently narrow and of sufficient depth that the medial aspect of the palm of a hand the ulnar aspect of which is resting on the center support thereof is supported by one of said support walls at an angle of at least 25° relative to the bottom face of the support body.

3. The hand stabilizer of claim 1 wherein:
each of said side support walls forms an inwardly bulging convex surface, the convex surfaces of said side support walls spaced apart a distance such that, when the palm of a hand the ulnar aspect of which is resting on the center support surface of said cradle is engaged with one of said convex surfaces, the other of said convex surfaces is disposed closely adjacent to the back of such hand for providing lateral support and a tactile reference surface therefor.

4. The hand stabilizer of claim 3 wherein:
the surface of each of said side walls having smoothly graduated lengthwise and vertical convex profiles for conforming to the palm of a hand.

5. The hand stabilizer of claim 1 wherein:
said support body has a planar bottom surface.

6. The hand stabilizer of claim 1 wherein:
said support body has an underside including an annular support surrounding a center recess, and
an annular non-slip ring mounted on the bottom of said support wall.

7. The hand stabilizer of claim 1 wherein:
said cradle includes a slip-resistant surface.

8. The hand stabilizer of claim 1 wherein:
each of said side support walls is disposed at an angle of approximately 33° to the center support surface of said cradle.

9. The hand stabilizer of claim 1 wherein:
said cradle is inclined at an angle of approximately 19° to said bottom surface.

10. The hand stabilizer of claim 1 wherein:
said cradle has a length suitable for supporting the ulnar aspect of the palm of a hand resting on said cradle while leaving the fingers thereof unobstructed.

11. The hand stabilizer of claim 1 wherein said support body is rigid.

12. The hand stabilizer of claim 1 wherein:
the depth of the cradle between the proximal and distal edges thereof is at least one-half the width.

13. The hand stabilizer of claim 1 wherein:
the width of the cradle at the distal edges thereof is at least twenty-five percent narrower than at the proximal edges.

14. A method for stabilizing a hand comprising:
placing a support body having an upwardly facing cradle on a work surface, said cradle having a lengthwise slope including a proximal edge and a distal edge higher than said proximal edge,
engaging the phalangeal end of the ulnar aspect of a hand on the distal edge of the slope of said cradle,
engaging the wrist end of the ulnar aspect of the hand on the proximal edge of the slope of said cradle,
such that the ulnar aspect of the hand is supported in said cradle in an inclined configuration wherein the wrist end of the ulnar aspect thereof is positioned close to the work surface and the phalangeal end of the ulnar aspect thereof is elevated above the work surface in order to position the fingers of such hand above the work surface so that an instrument being grasped by the supported hand can be manipulated on an object on the work surface adjacent the support body with improved manual dexterity.

15. The method for stabilizing a hand of claim 14 further comprising:
canting the palm of the hand until it rests against one of two opposing shoulders between which said cradle is formed, such that the fingers of the hand are poised at an angle off one side of the support body.

* * * * *